US009768957B2

(12) United States Patent
Kumar

(10) Patent No.: US 9,768,957 B2
(45) Date of Patent: Sep. 19, 2017

(54) GENERATION AND MANAGEMENT OF MULTIPLE BASE KEYS BASED ON A DEVICE GENERATED KEY

(71) Applicant: CRYPTOGRAPHY RESEARCH, INC., San Francisco, CA (US)

(72) Inventor: Ambuj Kumar, Sunnyvale, CA (US)

(73) Assignee: Cryptography Research, Inc., Sunnyvale, CA (US)

( * ) Notice: Subject to any disclaimer, the term of this patent is extended or adjusted under 35 U.S.C. 154(b) by 87 days.

(21) Appl. No.: 14/679,929

(22) Filed: Apr. 6, 2015

(65) Prior Publication Data

US 2015/0312036 A1    Oct. 29, 2015

Related U.S. Application Data

(60) Provisional application No. 61/983,416, filed on Apr. 23, 2014, provisional application No. 62/036,409, filed on Aug. 12, 2014.

(51) Int. Cl.
*G06F 21/00* (2013.01)
*H04L 9/08* (2006.01)
*H04L 9/00* (2006.01)
*H04L 9/32* (2006.01)

(52) U.S. Cl.
CPC .................. *H04L 9/0866* (2013.01)

(58) Field of Classification Search
None
See application file for complete search history.

(56) References Cited

U.S. PATENT DOCUMENTS

| | | | | |
|---|---|---|---|---|
| 7,660,998 | B2 * | 2/2010 | Walmsley | B41J 2/04505 713/189 |
| 2001/0041593 | A1 * | 11/2001 | Asada | H04L 63/0428 455/558 |
| 2007/0130472 | A1 * | 6/2007 | Buer | H04L 63/0428 713/182 |
| 2008/0046733 | A1 * | 2/2008 | Rodgers | G06F 21/31 713/171 |
| 2011/0038481 | A1 * | 2/2011 | Modave | G06Q 20/02 380/277 |
| 2011/0208975 | A1 * | 8/2011 | Sibert | G06F 21/572 713/189 |
| 2012/0069995 | A1 * | 3/2012 | Matthews, Jr. | G06F 21/78 380/44 |
| 2012/0317344 | A1 * | 12/2012 | Sibert | G06F 21/572 711/103 |
| 2013/0310006 | A1 * | 11/2013 | Chen | H04W 12/04 455/411 |
| 2014/0044265 | A1 * | 2/2014 | Kocher | H04L 9/30 380/277 |
| 2014/0089685 | A1 * | 3/2014 | Suzuki | H04L 9/0866 713/193 |
| 2015/0086019 | A1 * | 3/2015 | Tamminen | H04L 9/0819 380/278 |

* cited by examiner

*Primary Examiner* — Eric Chen
(74) *Attorney, Agent, or Firm* — Lowenstein Sandler LLP

(57) ABSTRACT

A request to generate a first key may be received. A device generated key that is stored in a memory may be received in response to the request. Furthermore, a first entity identification (ID) that is stored in the memory may be received. The first key may be generated based on the first entity ID and the device generated key that are stored in the memory.

20 Claims, 12 Drawing Sheets

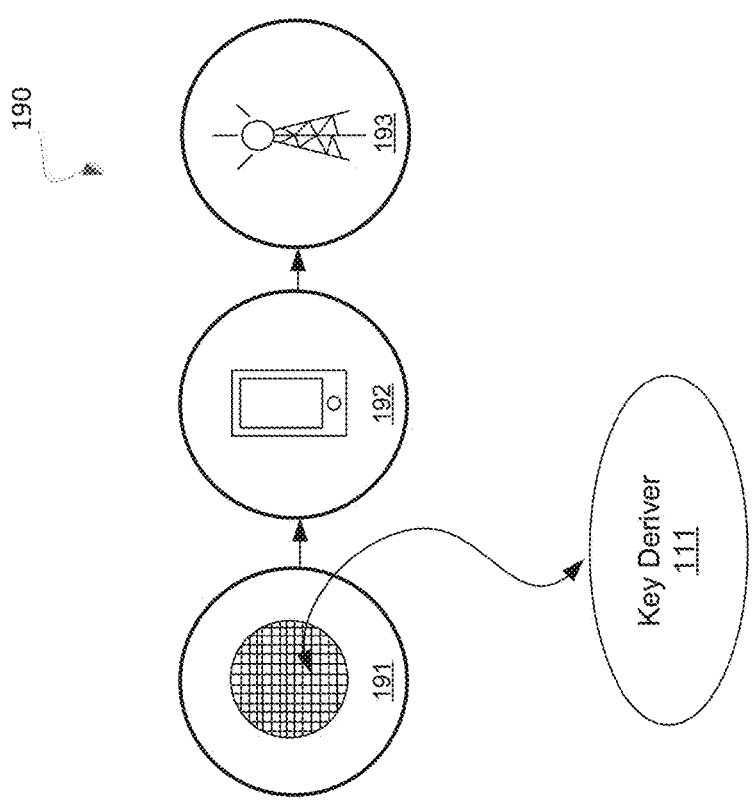

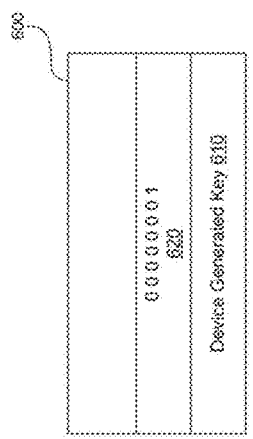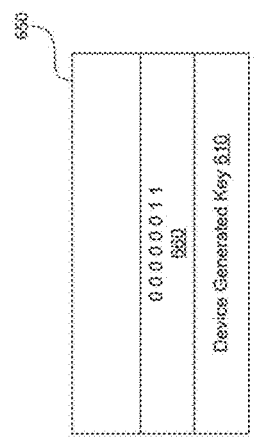

GENERATION AND MANAGEMENT OF MULTIPLE BASE KEYS BASED ON A DEVICE GENERATED KEY

RELATED APPLICATIONS

This application claims the benefit under 35 U.S.C. §119 (e) of U.S. Provisional Application 62/036,409 filed on Aug. 12, 2014 and U.S. Provisional Application No. 61/983,416 filed on Apr. 23, 2014, which are hereby incorporated by reference.

BRIEF DESCRIPTION OF THE DRAWINGS

The present disclosure will be understood more fully from the detailed description given below and from the accompanying drawings of various implementations of the disclosure.

FIG. 1A illustrates an example lifecycle of an integrated circuit including a key deriver in accordance with some embodiments of the present disclosure.

FIG. 6A is a block diagram of an example one-time programmable (OTP) memory in accordance with some embodiments.

FIG. 6B is a block diagram of an example OTP memory with an updated entity ID in accordance with some embodiments.

DETAILED DESCRIPTION

Figure 1B:
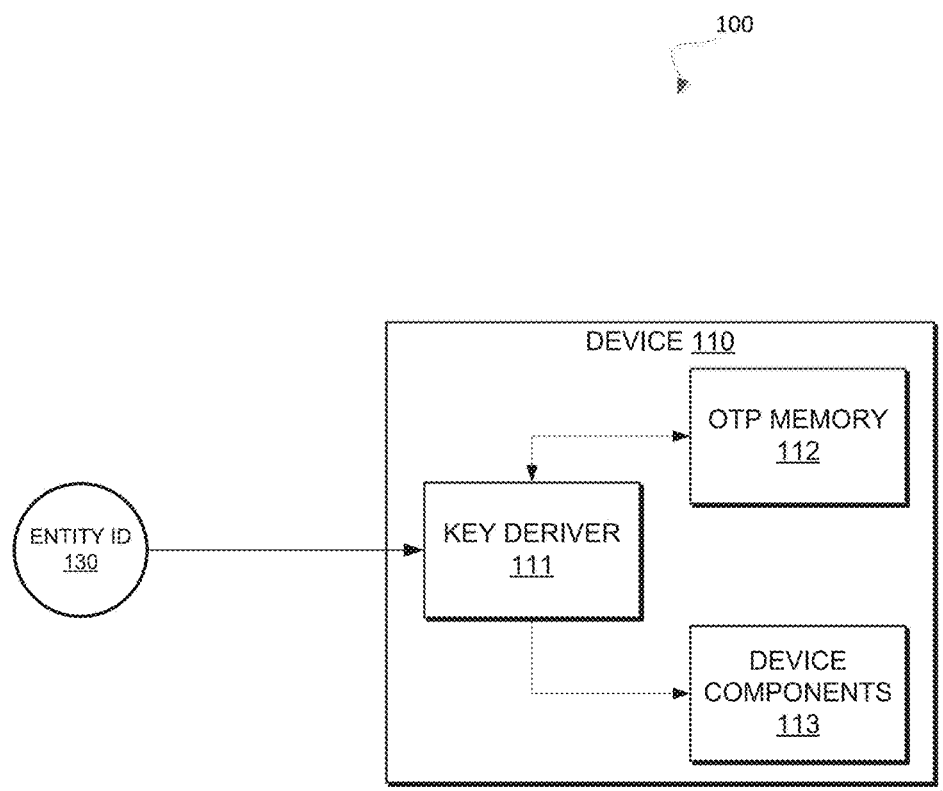
FIG. 1B illustrates an example environment to generate a derived base key based on a device generated key and an entity identification (ID) in accordance with some embodiments.

Aspects of the present disclosure relate to the deriving of a key from a device generated key. In some embodiments, a key may be derived or generated based on a combination of another key and additional identification (ID) information. For example, a derived base key may be generated based on a combination of a device generated key and entity ID information. The device generated key may be a key that is generated by a circuit and is stored in a memory associated with the circuit that is used by one or more devices.

Base keys may be stored in a one-time programmable (OTP) memory. In general, OTP memory may be a type of digital memory where the setting of each bit of the OTP memory may be considered to be permanent. The OTP memory may be more expensive and have less capacity than other types of memory (e.g., memory that does not involve the permanent setting of bits). Accordingly, a device that uses an OTP memory may be limited in the memory capacity that may be used to store keys. Additionally, the programming of the OTP to store base keys may take time during the manufacturing of the OTP memory. A manufacturer of the circuit that is associated with the OTP memory may be required to provide different base keys for different entities that may utilize the circuit at different times. For example, the circuit may be manufactured at a manufacturing facility and the memory may be used to store a first base key for a first entity (e.g., the manufacturer of the circuit). The first base key for the first entity may be used to provide a particular authentication service or a particular operation (e.g., authenticating to play a video based on digital rights management) based on the use of the first base key. A second entity (e.g., another manufacturer of a device that incorporates the circuit) may subsequently utilize the circuit and the associated memory in a device. For example, the second entity may incorporate the circuit and the memory in another device and may further require a second base key to be used to provide a particular authentication service or another operation based on the use of the second key. Thus, a first entity that manufactures the circuit and the associated OTP memory may be required to spend additional manufacturing time to program the OTP memory to include the first base key to be used by the first entity and the second base key to be used by the second entity.

Instead of storing separate copies of the first base key and the second base key in the OTP memory, a single device generated key may instead be stored in the OTP memory. The device generated key does not need to be provided by any entity (e.g., not provided by the first entity that manufactures a circuit associated with the OTP memory or by the second entity that manufactures the device) and instead may be randomly generated by the circuit or a device that incorporates the circuit and subsequently stored in the OTP memory. Additionally, the OTP memory may store additional information, which may be lesser in size than a key. The first base key and the second base key may be generated from a combination of the device generated key and additional information that may be stored in the OTP memory. For example, the first base key may be derived from the device generated key stored in the OTP memory and first additional information that is stored in the OTP memory and the second base key may be derived from the same device generated key that is stored in the OTP memory and second additional information that is stored in the OTP memory. A base key that is derived from a device generated key may be referred to as a derived base key and a key that is stored in the OTP memory and used to generate a derived base key may be referred to as a device generated key. The first and second additional information stored in the OTP memory may correspond to entity identification (ID) information. For example, the first additional information may be referred to as a first entity ID and the second additional information may be referred to as a second entity ID. In some embodiments, the entity IDs may correspond to an identification associated with an entity that is requesting the generation of a derived base key. Accordingly, the first base key may be generated based on a combination of the device generated key and the first entity ID and the second base key may be generated based on a combination of the same device generated key but a different (e.g., the second) entity ID. Thus, multiple base keys may be derived from a single device generated key that is stored in the OTP memory, thereby allowing less OTP memory to be used to store any keys and requiring no manufacturing time to program additional base keys to be stored into the OTP memory while enabling functionality to generate multiple derived base keys. Furthermore, since the device generated key is randomly generated by the circuit and is not provided by the first entity that manufactures the circuit associated with the OTP memory, the second entity requesting the second derived base key may be assured that the second derived key is secure and private because no other entity knows the exact contents of the device generated key that can be used to generate the second derived base key. Similarly, any entity (e.g., an Original Equipment Manufacturer (OEM) or Original Design Manufacturer (ODM) or a service provider, etc.) that generates a base key for itself can rest assured that no-one else (not even the circuit manufacturer) has any knowledge of its base key.

In some embodiments, the entity ID may correspond to a value of a counter. For example, the OTP memory may store a device generated key and a number of bits corresponding to a value of the counter. As an example, the counter may be an 8-bit counter including the bits '00000000.' When the device generated key is stored into the OTP memory, the counter may be incremented to a value of '00000001.' Subsequently, a derived base key may be requested and the derived base key may be generated based on the device generated key and the value of the counter currently set at '00000001.' At a second time, a different entity may use a circuit that is associated with the OTP memory and may seek to generate a different derived base key. Accordingly, the value of the counter may be incremented to a value of '00000011' (as the counter is stored in OTP memory) and the new derived base key may be generated based on the same device generated key but with the new value of the counter after incrementing the value of the counter (e.g., '00000011' instead of '00000001'). Thus, in such an embodiment, the OTP memory may store the device generated key and a value corresponding to a counter.

As such, the generation of different derived base keys based on a same device generated key and different entity ID information may result in the use of less OTP memory while allowing for the functionality to generate multiple derived base keys.

FIG. 1A illustrates an example lifecycle 190 of an integrated circuit including a key deriver. In general, the lifecycle 190 illustrates the handling of an integrated circuit that includes a key deriver 111 through various stages of the lifecycle 190 involving different entities. In some embodiments, the key deriver 111 of the integrated circuit may generate a derived base key.

As shown in FIG. 1, the lifecycle 190 may involve various entities utilizing the integrated circuit at various times. For example, a first entity 191 may be a manufacturing entity that manufactures or fabricates the integrated circuit that includes a key deriver 111. In some embodiments, the key deriver 111 may include a memory (e.g., an OTP memory) and the key deriver 111 may generate a device generated key and may store the device generated key in the memory. Accordingly, the first entity 191 does not provide the device generated key that is to be stored in the memory. Instead, the key deriver 111 itself generates and stores the device generated key in the memory. Thus, the first entity 191 does not have knowledge of the contents of the device generated key.

The lifecycle 190 may include a second entity 192. For example, the second entity 192 may be a device manufacturer that includes or incorporates the integrated circuit into an electronics device. The second entity may require that the key deriver 111 generate a derived base key for the second entity. For example, the key deriver 111 may be used to generate a derived base key for the second entity by using the device generated key that was stored in the memory by the key deriver 111 itself. Accordingly, the second entity 192 may be assured that no other entity (e.g., the first entity 191) has knowledge of the device generated key that may be used to generate the derived base key used by the second entity. Thus, the second entity may be assured that the derived base key that it uses is secure and private.

Additionally, a third entity 193 may interact with the electronics device that includes the integrated circuit. For example, the integrated circuit may be a communications circuit that is incorporated into a cellular phone or other such mobile device and the third entity 193 may be a type of service provider for communications services used by the cellular phone. The third entity 193 may further use the key deriver 111 to generate an additional derived base key for use by the third entity 193. Since the additional derived base key for the third entity 193 is also generated based on the device generated key, the third entity 193 may also be assured that the additional derived base key is also secure and private from any other entities (e.g., the first entity 191 and the second entity 192).

Accordingly, the key deriver 111 may be used to derive separate base keys for different entities as an integrated circuit that includes the key deriver 111 progresses through a lifecycle 190. The key deriver 111 may derive the separate base keys based on a device generated key that is not provided by any other entity. Thus, since no entity knows of the contents of the device generated key, each of the entities that uses a derived base key may be assured of the security and privacy of its derived base key (e.g., no entity can create an unauthorized copy of a derived base key from having knowledge of the device generated key).

FIG. 1B illustrates an example environment 100 to generate a derived base key from a device generated key and entity identification (ID) information. In general, the example environment 100 illustrates the use of a first key (e.g., a device generated key) and identification information (e.g., an entity ID) that are stored in an OTP memory and are used to generate or derive a second key (e.g., a derived base key).

As shown in FIG. 1B, the example environment 100 illustrates a device generated key and an entity ID 130 that may be used to generate one or more derived base keys by a device 110. In some embodiments, the device 110 may include a key deriver 111, one-time programmable (OTP) memory 112, and various device components 113. The key deriver 111 may receive a request to generate a device generated key and to store the device generated key in the OTP memory 112 and may also receive an entity ID 130 that is to be stored in the OTP memory 112. Additionally, the key deriver 111 may receive the device generated key after it has been stored or provisioned in the OTP memory 112. Furthermore, the key deriver 111 may receive the entity ID 130 to update entity ID information stored in the OTP memory 112. Accordingly, the key deriver may generate a derived base key based on a device generated key and an entity ID that is stored in the OTP memory 112. The device components 113 may receive the derived base key from the key deriver 111. The key deriver 111 may be implemented in an integrated circuit included in the device 110. Further details with regard to the architecture of the key deriver 111 of a device 110, the generating of a device generated key, and the generating of a derived base key are described in further detail below with regard to FIGS. 2-8.

Figure 2:
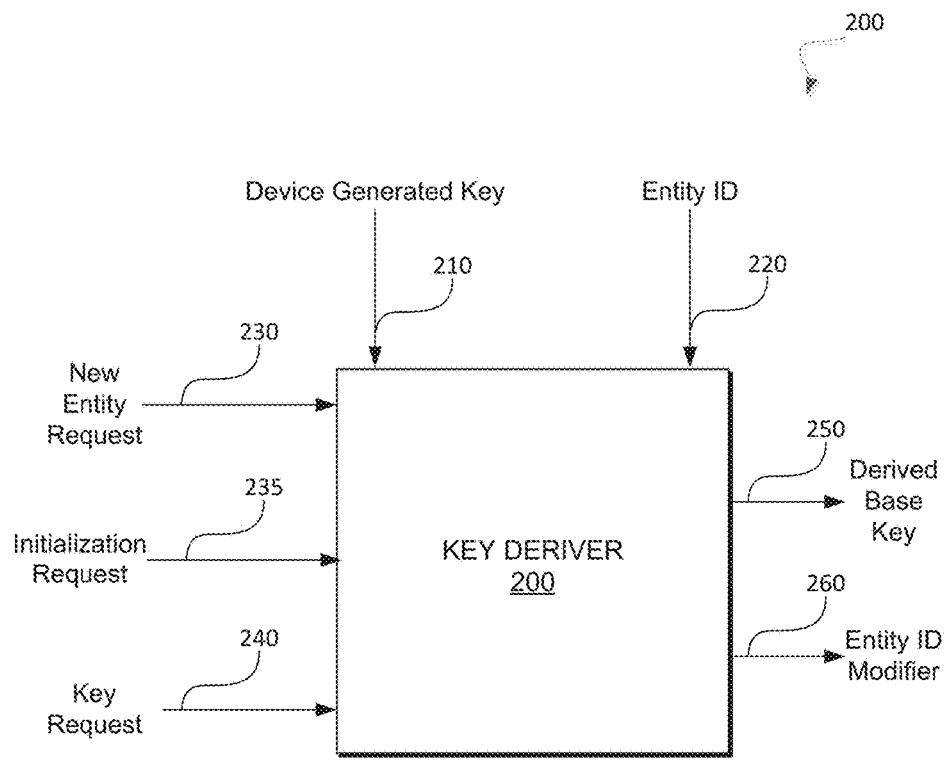
FIG. 2 is a block diagram of an example key deriver in accordance with some embodiments of the present disclosure.

FIG. 2 is a block diagram of an example key deriver 200. In general, the key deriver 200 may correspond to the key deriver 111 of FIGS. 1A and 1B. The key deriver 111 may be used in a device to generate a derived base key based on a combination of a device generated key and an entity ID.

As shown in FIG. 2, the key deriver 200 may receive an initialization request 235, new entity request 230, or a key request 240. In some embodiments, the initialization request 235 may result in the key deriver 200 creating a device generated key and storing the device generated key in an OTP memory. For example, the key deriver 200 may randomly generate the device generated key at one time and may generate the device generated key based on conditions of a circuit that includes the key deriver 200. In some embodiments, the key deriver 200 may only create or store the device generated key at one time in response to only the first initialization request 235. In some embodiments, the key request 240 may result in the generation of a derived base key based on a device generated key and an entity ID that are stored in an OTP memory (e.g., OTP memory 112). In response to receiving the key request 240, the key deriver 200 may receive a device generated key 210 and an entity ID 220 from the OTP memory. The key deriver 200 may further generate or create a derived base key 250 based on the received device generated key 210 and the entity ID 220 in response to the key request 240. Thus, the derived base key 250 may be generated from a device generated key 210 and an entity ID 220 at each time a key request 240 is received.

In the same or alternative embodiments, the OTP memory may be a type of digital memory implemented in circuitry or silicon of a device that may be programmed and cannot be changed after being programmed. For example, the device generated key may be programmed into the OTP memory of a device and the device generated key may not be changed in the OTP memory after the programming of the device generated key into the OTP memory. Furthermore, the entity ID may be programmed into the OTP memory and entity ID information may be updated in response to the entity ID modifier 260. For example, as described in further detail below, the entity ID information may include a list of entity IDs. In such an example, the entity ID modifier 260 may update the entity ID information by adding a new entity ID to the entity ID information that is stored in the OTP memory. In alternative embodiments, the entity ID information may correspond to bits of a counter and the entity ID modifier 260 may result in the changing of a value of the counter. Further details with regard to the entity ID are described in further detail below.

Thus, the key deriver 200 may generate a derived base key that is based on a device generated key and an entity ID when a key request has been received. Furthermore, the key deriver 200 may modify entity ID information that is stored in an OTP memory in response to a request identifying a new entity. In some embodiments, the key deriver 200 may generate a new derived base key based on the same device generated key and the updated entity ID information that identifies the new entity in response to a subsequent key request that is associated with the new entity ID.

Figure 3:
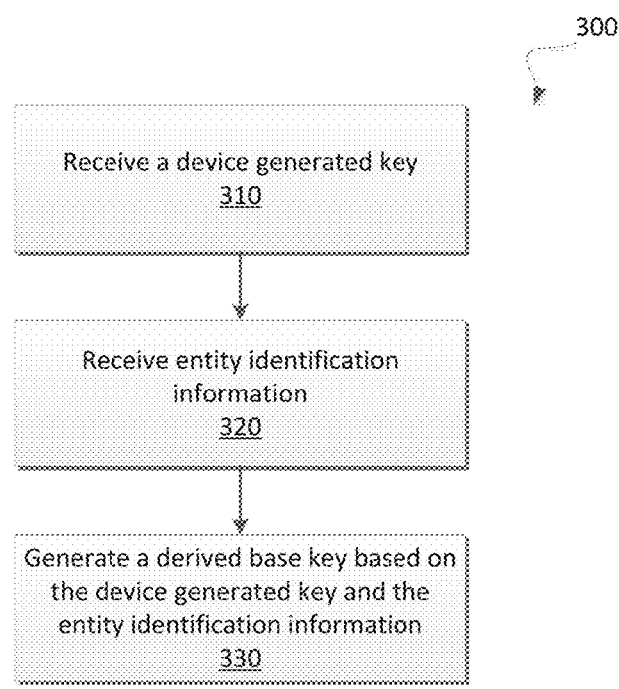
FIG. 3 is a flow diagram of an example method to generate a derived base key in accordance with some embodiments.

FIG. 3 is a flow diagram of an example method 300 to generate a derived base key. In general, the method 300 may be performed by processing logic that may comprise hardware (e.g., processing device, circuitry, dedicated logic, programmable logic, microcode, hardware of a device, etc.), software (e.g., instructions run or executed on a processing device), or a combination thereof. In some embodiments, the method 300 may be performed by the key deriver 200 of FIG. 2 or the key deriver 111 of FIGS. 1A and 1B.

As shown in FIG. 3, the method 300 may begin with the processing logic receiving a device generated key (block 310) and receiving entity ID information (block 320). For example, a one-way function (e.g., a component that performs a hash-based function) may receive the device generated key and the entity ID information from an OTP memory. In some embodiments, the device generated key may be stored in a first location of the OTP memory and the entity ID information may be stored in a second location of the OTP memory. Furthermore, a portion of the entity ID information that is stored in the second location of the OTP memory may be received (e.g., a particular entity ID from a list of entity IDs) or the entire entity ID information that is stored in the second location of the OTP memory may be received (e.g., a value of a counter corresponding to the entity ID information). In some embodiments, the device generated key may be considered secret information (e.g., an entity that requests a derived base key may not know of the contents of the device generated key) and the entity ID may be considered either public information or secret information. For example, the entity ID may correspond to a value of a counter or the entity ID information may not be shared with other entities when an entity ID information is updated to include a new entity ID. The processing logic may further generate a derived base key from the device generated key and the entity ID information (block 330). For example, a one-way function may generate the derived base key based on the device generated key and the entity ID information. In some embodiments, the one-way function may be a key tree component as is described in further detail with regard to FIGS. 4 and 8.

Figure 4:
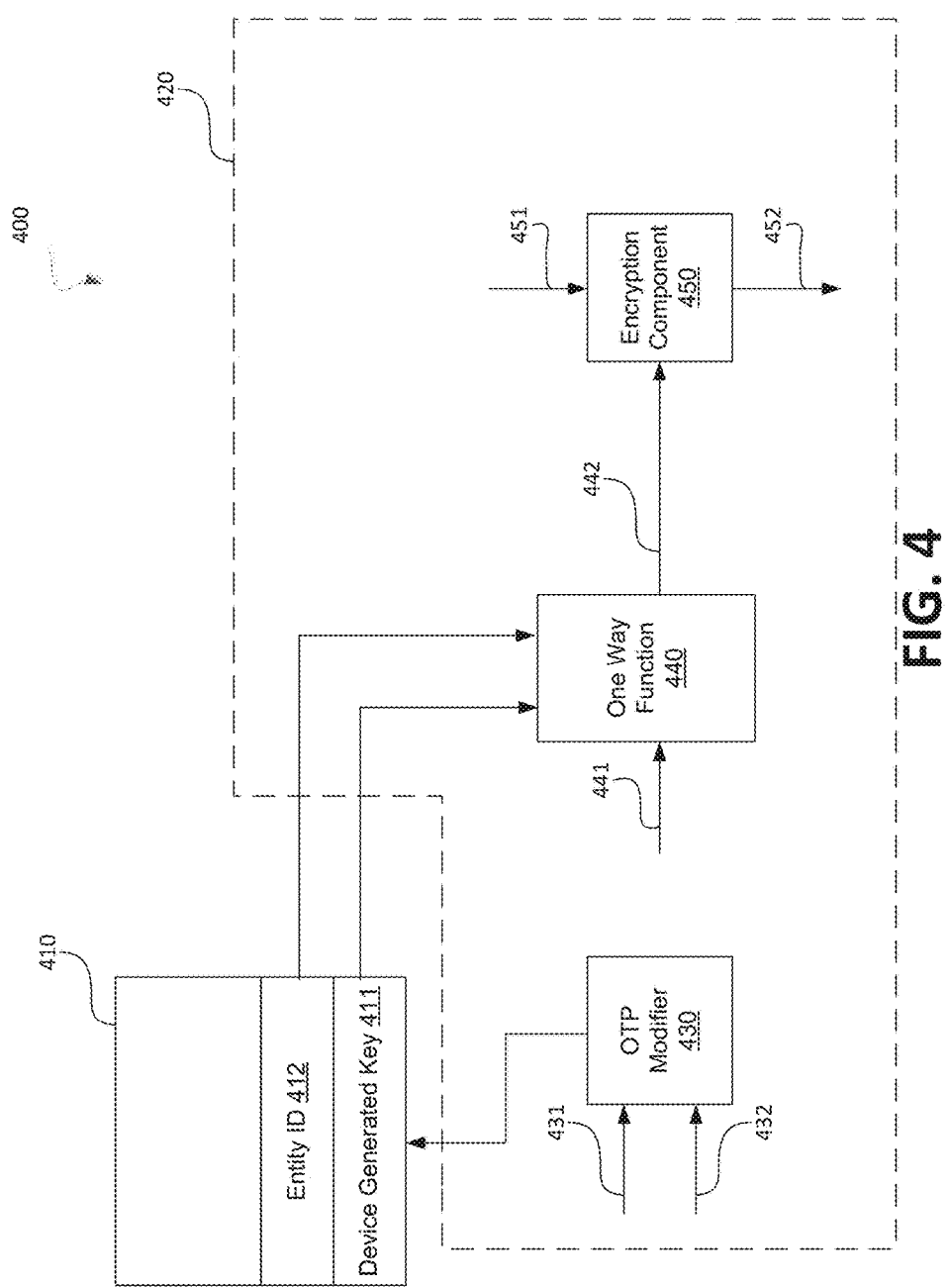
FIG. 4 is an example architecture of a key deriver in accordance with some embodiments of the disclosure.

FIG. 4 is an example architecture 400 of a key deriver 420 and an OTP memory 410. In general, the key deriver 420 may correspond to the key deriver 111 of FIGS. 1A and 1B and the key deriver 200 of FIG. 2. The key deriver 420 may receive a device generated key (e.g., the device generated key 120 or device generated key 210) and entity identification information (e.g., entity ID 130 or entity ID 220) and generate a derived base key (e.g., derived base key 250) based on the device generated key and the entity ID information. The architecture 400 may further include an OTP memory 410 that may correspond to the OTP memory 112 of FIG. 1B. Although the architecture 400 illustrates a key deriver 420 and a separate OTP memory 410, in some embodiments, the key deriver 420 and the OTP memory 410 may correspond to a single component.

As shown in FIG. 4, the architecture 400 may include an OTP memory 410 and a key deriver 420. In some embodiments, the OTP memory 410 and the key deriver 420 may be part of a device. For example, the OTP memory 410 and the key deriver 420 may be implemented in circuitry of the device. Furthermore, the OTP memory 410 may store a device generated key 411 and entity ID information 412 that may be used to generate or create a derived base key 442. The key deriver 420 may receive an initialization request 431 and a new entity ID request 432. For example, an OTP modifier component 430 may receive the initialization request 431 and may randomly generate a device generated key and may store the random device generated key into the OTP memory 410 (e.g., as the device generated key 411). In some embodiments, the device generated key 411 may only be randomly generated and stored into the OTP memory 410 at one time (e.g., at manufacturing of the OTP memory 410). Further details with regard to the random generation of the device generated key are disclosed with regard to FIG. 5A.

Furthermore, the OTP modifier component 430 may receive the new entity ID request 432 and may update the entity ID information 412 that is stored in the OTP memory 410 based on the new entity ID request 432. The key deriver 420 may further include a one-way function component 440. In some embodiments, a one-way function may receive two or more inputs and may generate a result based on the two or more inputs. For example, the one-way function may perform a hash based computation or function on the device generated key 411 and at least a portion of the entity ID 412 that are stored in the OTP memory 410 to generate a derived base key 442. In some embodiments, the one-way function component 440 may generate the derived base key 442 in response to receiving a key request 441. For example, the one-way function may generate and output the derived base key 442 from a combination of the device generated key 411 and the entity ID 412 in response to the key request 441. The one-way function component 440 may include a key tree component to protect the generation or creation of the derived base key 442 by the key tree component from external monitoring attacks such as differential power analysis (DPA) or other such unauthorized attacks that may attempt to gather information that is correlated to the internal operations of a device including the key deriver 420. An example function of the key tree component may include, but is not limited to, a cryptographic hash function. Thus, the use of the key tree component may be to diversify or modify the device generated key 411 with an entity ID 412. Further details with regard to the key tree component are disclosed with regard to FIG. 8.

The key deriver 420 may further include an encryption component 450. In some embodiments, the encryption component 450 may receive the derived base key 442 and an additional key 451 and may generate an encrypted key 452 from the derived base key 442 and the additional key 451. For example, in some embodiments, a first entity may be associated with the derived base key 442 that is generated by the key deriver 420. A second entity may incorporate circuitry of the key deriver 420 into a device that is manufactured by the second entity. Accordingly, the second entity may wish to have the output of the key deriver 420 to be based on a key that is only known to the second entity. Thus, the second entity may provide (e.g., through additional circuitry of a device) an additional key 451 that will be encrypted with the derived base key 442 to generate the encrypted key 452. In some embodiments, the encryption component 450 may be an advanced encryption standard (AES) component. In some embodiments, the AES component may receive the derived base key 442 and the additional key 451 and combine the derived base key 442 and the additional key 451 to generate or create an encrypted key 452 as the output. In some embodiments, the AES component may generate or create the encrypted key 452 based on encrypting the combination of the derived base key 442 and the additional key 451. For example, the AES component may receive 256 bits corresponding to the derived base key 442 and an additional 256 bits corresponding to the additional key 451 and may generate or create the encrypted key 452 of 256 bits based on encrypting a combination of the derived base key 442 and the additional key 451. An example of an encryption mechanism includes, but is not limited to, the Advanced Encryption Standard (AES).

Figure 5A:
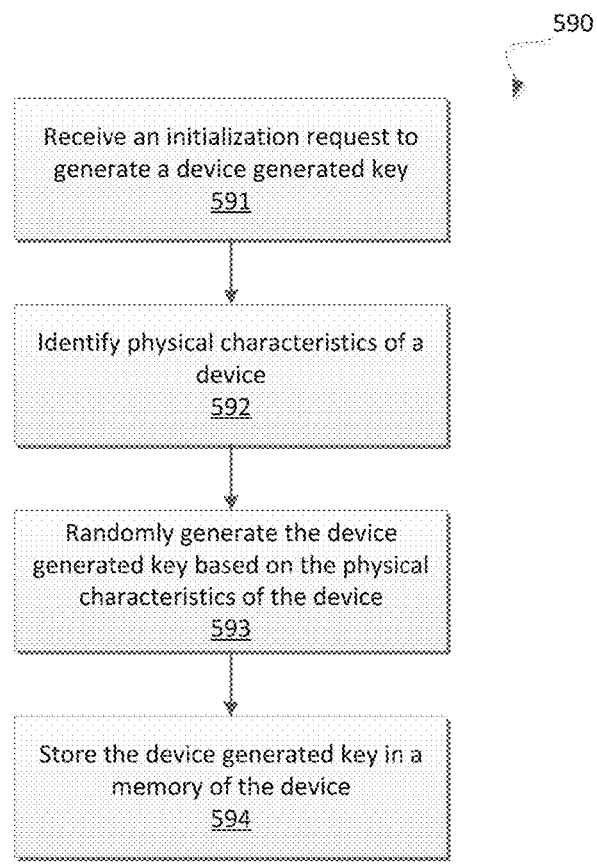
FIG. 5A is a flow diagram of an example method to store a device generated key in accordance with some embodiments.

FIG. 5A is a flow diagram of an example method 590 to generate and store a device generated key in accordance with some embodiments. In general, the method 590 may be performed by processing logic that may comprise hardware (e.g., processing device, circuitry, dedicated logic, programmable logic, microcode, hardware of a device, etc.), software (e.g., instructions run or executed on a processing device), or a combination thereof. In some embodiments, the method 500 may be performed by the key deriver 111 of FIGS. 1A and 1B, the key deriver 200 of FIG. 2, or the key deriver 420 of FIG. 4.

As shown in FIG. 5A, the method 500 may begin with the processing logic receiving an initialization request to generate a device generated key (block 591). In some embodiments, the processing logic may only respond to the initialization request once. For example, the processing logic may not respond to the initialization request after a device generated key has been stored in a memory of a device. The processing logic may identify physical characteristics of the device (block 592). Examples of physical characteristics of a device include, but are not limited to, hardware based oscillators, temperature of an integrated circuit that includes a key deriver, or other such characteristics that may be unique to a device or an integrated. As an example, the hardware based oscillators may be used to sample a signal to obtain a value of '0' or '1' and the sampled values may be randomly obtained or identified. Furthermore, in some embodiments, other characteristics such as time (e.g., the current time) may be used to generate or partly generate the device generated key. The processing logic may further randomly generate the device generated key based on the physical characteristics of the device (block 593). For example, the value of each bit of the device generated key may be randomly selected to be a '0' or a '1' based on the physical characteristics of the device. Subsequently, the randomly generated device generated key may be stored in a memory of the device (block 594). For example, the device generated key may be stored in an OTP memory of the device.

Figure 5B:
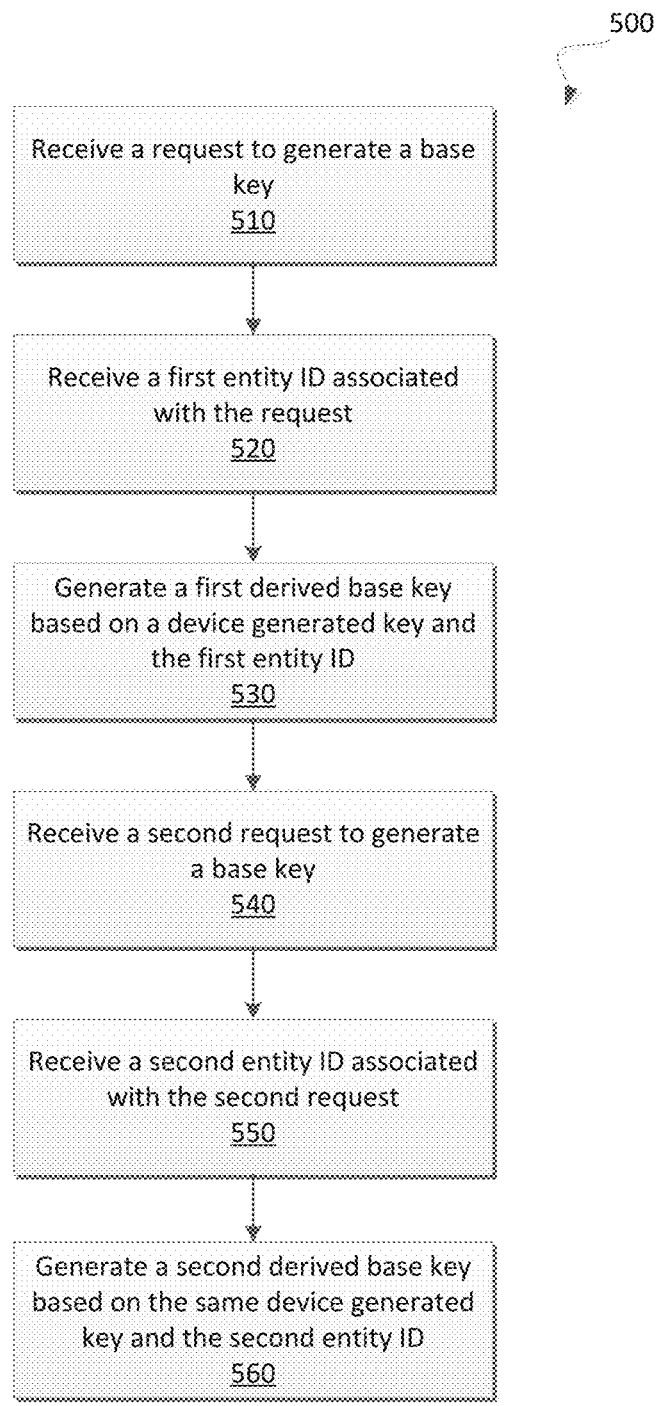
FIG. 5B is a flow diagram of an example method to generate a derived base key based on an entity ID and a device generated key in accordance with some embodiments.

FIG. 5B is a flow diagram of an example method 500 to generate a derived base key based on an entity ID and a device generated key. In general, the method 500 may be performed by processing logic that may comprise hardware (e.g., processing device, circuitry, dedicated logic, programmable logic, microcode, hardware of a device, etc.), software (e.g., instructions run or executed on a processing device), or a combination thereof. In some embodiments, the method 500 may be performed by the key deriver 111 of FIGS. 1A and 1B, the key deriver 200 of FIG. 2, or the key deriver 420 of FIG. 4.

As shown in FIG. 5B, the method 500 may begin with the processing logic receiving a request to derive a key (block 510). For example, a one-way function component may receive an indication to generate a derived base key in response to the request to derive the key. The processing logic may further receive a first entity ID associated with the request (block 520). For example, an OTP memory may store a list of entity IDs and the processing logic may identify a particular entity ID from the list of entity IDs that matches an entity ID associated with the request. The processing logic may further generate a first derived base key based on the device generated key and the first entity ID (block 530). For example, a hash function may be performed on the device generated key and the first entity ID to generate the first derived base key. The processing logic may receive a second request to derive a key (block 540). Additionally, the processing logic may receive a second entity ID associated with the second request (block 550). For example, the second entity ID may include a second identity and is different from the first entity ID that is used to generate the first derived base key. The processing logic may subsequently generate a second derived base key based on the same device generated key that is used to derive the first derived base key and the second entity ID (block 560).

Thus, a first derived base key and a second derived base key may be generated based on the same device generated key that is stored in an OTP memory. However, the first derived base key may further be generated based on a first entity ID and the second derived base key may further be generated based on a second entity ID that is different than the first entity ID. Accordingly, the first derived base key may be different than the second derived base key although both the first derived base key and the second derived base key may be based on a single device generated key that is stored in the OTP memory. Furthermore, the first derived base key and the second derived base key may not be stored in the OTP memory. Thus, the first derived base key and the second derived base key may continuously be generated from the device generated key and corresponding entity ID in response to requests to generate the derived base keys.

FIG. 6A is a block diagram of an example one time programmable (OTP) memory 600. In general, the OTP memory 600 may correspond to the OTP memory 112 of FIG. 1B or the OTP memory 410 of FIG. 4. The OTP memory 600 may store a device generated key (e.g., device generated key 120, 210, or 411) and a value of a counter corresponding to an entity ID (e.g., entity ID 130, 220, or 412).

As shown in FIG. 6A, the OTP memory 600 may include multiple storage locations or fields. For example, the OTP memory 600 may include a first location or first field to store a device generated key 610. Additionally, the OTP memory 600 may include a second location or second field to store entity ID information such as a value 620 of a counter. As previously described, the OTP memory 600 may be a type of memory where each bit of the memory may be programmed or set once. In some embodiments, the programming or the setting of each bit of the OTP memory is locked by a fuse (e.g., an electrical fuse associated with a low resistance and designed to permanently break an electrically conductive path after the programming or setting of a corresponding bit) or an antifuse (e.g., an electrical component associated with an initial high resistance and designed to permanently create an electrically conductive path after the programming or setting of a corresponding bit). As an example, each bit of the OTP memory may start with an initial value of '0' and may be programmed or set to a later value of '1' (or vice versa). Thus, in order to program or set a device generated key with a value of '00000001' into the OTP memory, one bit of the OTP memory may be programmed from the initial value of '0' to the later value of '1.' Once the bit of the OTP memory has been programmed to the later value of '1', then the bit may not be programmed back to the value of '0.'

Accordingly, the value 620 of the counter may be set by programming individual bits of the OTP memory 600. As an example, eight bits of the OTP memory may be used to store a value 620 of the counter. The first bit of the OTP memory may be programmed to a value of '1' so that the value 620 of the counter represents a value of '00000001.' In some embodiments, each value of a counter may represent a different entity ID. For example, the first value of the counter (e.g., value 620) may correspond to a first entity ID and a second value of the counter (e.g., after the programming of another bit of the OTP memory) may correspond to a second entity ID.

FIG. 6B is a block diagram of an example one time programmable (OTP) memory 650 with an updated entity ID. In general, the OTP memory 650 may correspond to the OTP memory 600 after the programming of at least one additional bit corresponding to the value of a counter.

As shown in FIG. 6B, the OTP memory 650 may store the device generated key 610 in a first location. For example, the value (e.g., bits) of the device generated key 610 may not be changed. Furthermore, the OTP memory 650 may store a value 660 of the counter. For example, the first value of the counter may correspond to a value of '00000001' and the value 660 of the counter may correspond to a second value of '00000011' of the same counter after it has been incremented. Accordingly, the incrementing of the counter may include the programming of an additional bit of the OTP memory.

As previously described, a derived base key may be generated from the device generated key and entity ID (e.g., the value of a counter). The entity ID may be changed by programming a different bit that is assigned to a counter while the device generated key may remain unchanged. Thus, a first derived base key may be generated from the device generated key and a first value of a counter and a second derived base key may be generated from the same device generated key and a second value of the same counter.

Figure 7A:
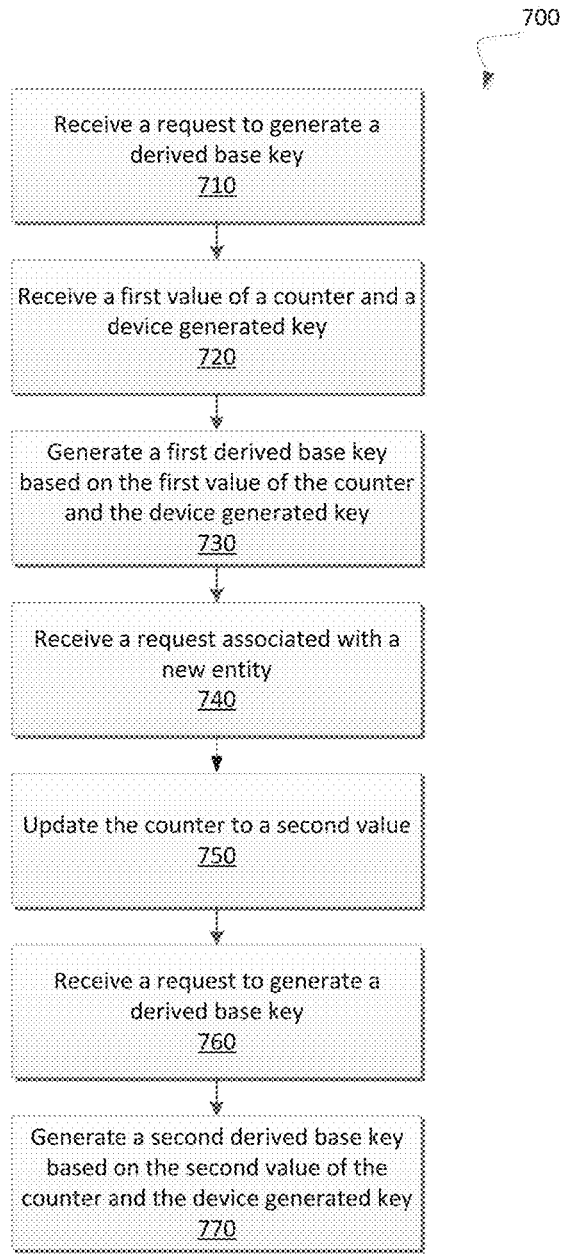
FIG. 7A is a flow diagram of an example method to generate a derived base key from a device generated key and a value of a counter in accordance with some embodiments.

FIG. 7A is a flow diagram of an example method 700 to generate a derived base key from a device generated key and a value of a counter. In general, the method 700 may be performed by processing logic that may comprise hardware (e.g., processing device, circuitry, dedicated logic, programmable logic, microcode, hardware of a device, etc.), software (e.g., instructions run or executed on a processing device), or a combination thereof. In some embodiments, the method 700 may be performed by the key deriver 111 of FIGS. 1A and 1B, the key deriver 200 of FIG. 2, or the key deriver 420 of FIG. 4.

As shown in FIG. 7, the method 700 may begin with the processing logic receiving a request to generate a derived base key (block 710). For example, a request to generate a derived base key based on a device generated key and an entity ID that is stored in an OTP memory may be received. The processing logic may further receive a first value of a counter and a device generated key (block 720). For example, the first value of the counter and the device generated key may be received from the OTP memory. Subsequently, the processing logic may generate a first derived base key based on the first value of the counter and the device generated key (block 730). The processing logic may further receive a request associated with a new entity (block 740). For example, the processing logic may receive a request to update the entity ID stored in an OTP memory. In some embodiments, the updating of the entity ID information may result in the incrementing of a value of a counter that is stored in the OTP memory. The value of the counter may be incremented by the programming of an additional bit of the OTP memory that corresponds to the value of the counter. Accordingly, the processing logic may update the counter to a second value (block 750). Next, the processing logic may receive another request to generate a derived base key (block 760). In response to the request to generate a derived base key, a second derived base key may be generated based on the second value of the counter and the device generated key (block 770). For example, the second derived base key may be generated based on the same device generated key that is used to generate the first derived base key, but the second derived base key may further be generated based on a different value of the same counter that is used to generate the first derived base key.

Accordingly, a value of a counter may be updated in response to a request for a new entity ID and a different derived base key may be generated based on the updated entity ID. Thus, a first entity ID may correspond to a first value of the counter and a second entity ID may correspond to a second value of the counter after the counter has been incremented.

Figure 7B:
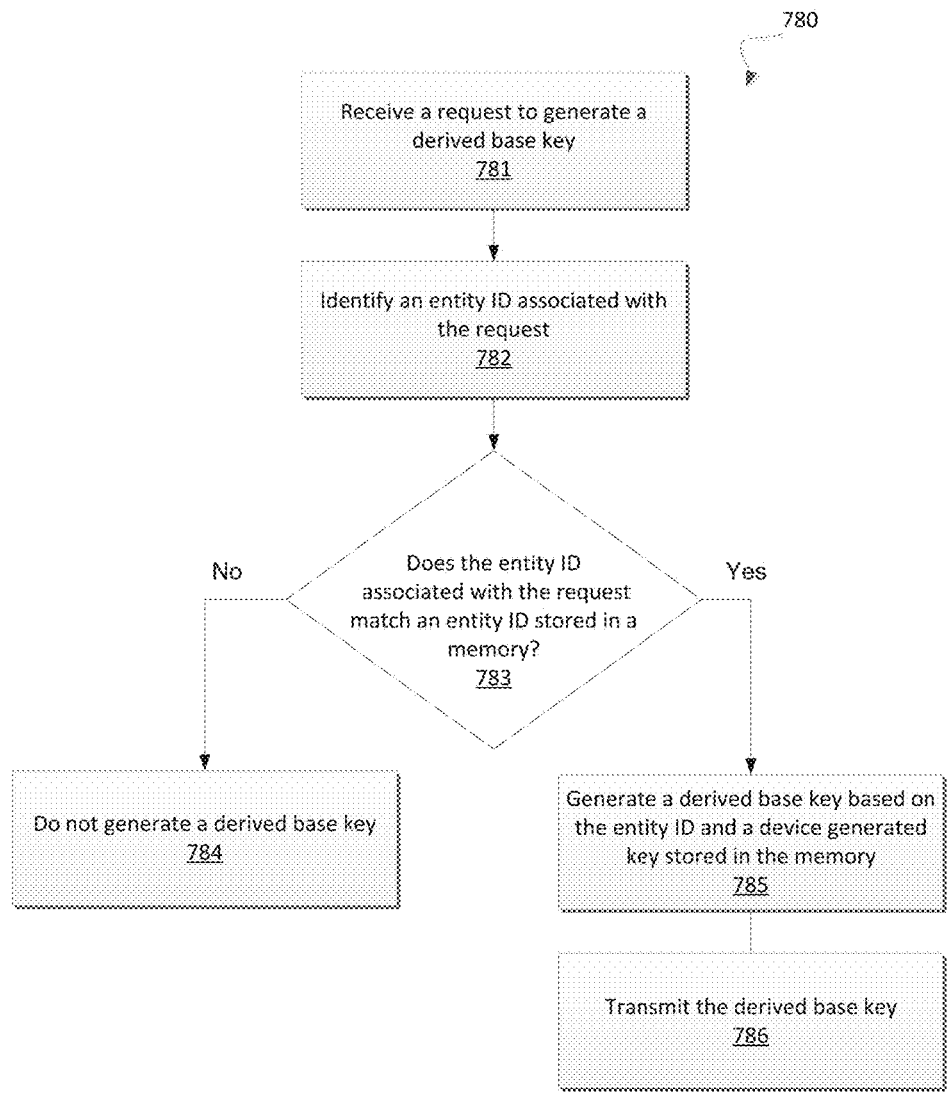
FIG. 7B is a flow diagram of an example method to generate a derived base key based on a device generated key and a matching entity ID in accordance with some embodiments.

FIG. 7B is a flow diagram of an example method 780 to generate a derived base key based on a device generated key and a matching entity ID. In general, the method 780 may be performed by processing logic that may comprise hardware (e.g., processing device, circuitry, dedicated logic, programmable logic, microcode, hardware of a device, etc.), software (e.g., instructions run or executed on a processing device), or a combination thereof. In some embodiments, the method 780 may be performed by the key deriver 111 of FIGS. 1A and 1B, the key deriver 200 of FIG. 2, or the key deriver 420 of FIG. 4.

As shown in FIG. 7B, the method 780 may begin with the processing logic receiving a request to generate a derived base key (block 781). The processing logic may further identify an entity ID associated with the request (block 782). For example, in some embodiments, the request to generate a derived base key may include an entity ID. In the same or alternative embodiments, the entity ID may be a numerical value or sequence that is assigned to an entity that utilizes a device. The processing logic may subsequently determine if the entity ID that is associated with the request matches an entity ID stored in a memory (block 783). For example, an OTP memory may store one or more entity IDs (e.g., a list of entity IDs or a counter that corresponds to a valid entity ID). In some embodiments, if the OTP memory stores a list of entity IDs, then the processing logic may determine if the received entity ID matches one of the entity IDs from the list of entity IDs that are stored in the OTP memory. In alternative embodiments, the OTP memory may store a value of a counter that corresponds to the entity ID. In such an embodiment, the processing logic may determine if the entity ID associated with the request to generate a derived base key matches the value of the counter that is stored in the OTP memory. Accordingly, if the processing logic determines that the entity ID associated with the request does not match an entity ID stored in the memory, then a derived base key may not be generated (block 784). However, if the processing logic determines that the entity ID associated with the request does match an entity ID stored in the memory, then the processing logic may generate a derived base key based on the entity ID and the device generated key that are stored in the memory (block 785). Furthermore, the processing logic may transmit the derived base key (block 786). In some embodiments, the processing logic may encrypt the derived base key before transmitting it. An example of such an encryption may include, but is not limited to, a Ferguson-Schneier public key exchange, but other schemes that provide the required privacy of the key will suffice. Use of the public key cryptography may be used to ensure that the derived base key is encrypted by hardware and can be decrypted only by the relevant entity. In the same or alternative embodiments, the derived base key may be transmitted to the entity that has requested the generation of the derived base key.

Figure 8:
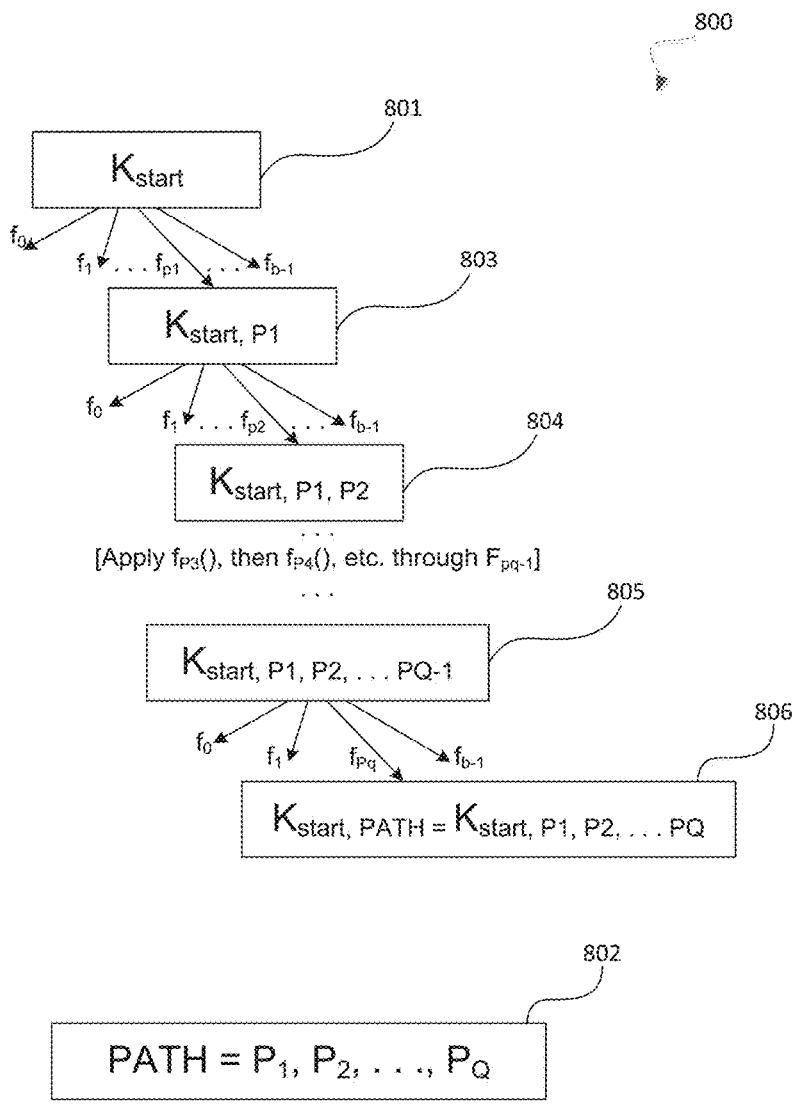
FIG. 8 is a block diagram of an example key tree in accordance with some embodiments of the present disclosure.

FIG. 8 is a block diagram of an example key tree 800 in accordance with some embodiments. In general, the key tree 800 may correspond to the one-way function component 440 of FIG. 4. The key tree 800 may receive a first input (e.g., the entity ID) and a second input (e.g., the device generated key) and produce a hash result that may correspond to a derived base key.

In some embodiments, the key tree 800 may perform an entropy redistribution operation. As used herein, an "entropy redistribution operation" (or "entropy distribution operation") may be an operation that mixes its input(s) (e.g., the entity ID and the device generated key) such that unknown information about input bits is redistributed among the output bits. For example, suppose an x bit cryptographic key $K_0$ is processed repeatedly with an entropy redistribution operation f such that key $K_i=f(K_{i-1})$ for each i>1. Next, suppose an adversary obtains y bits of information (e.g., obtained as part of an attempted external monitoring attack) about each of n different keys $K_i$, providing more than enough information to solve for key $K_0$ (e.g., y*n>x). The use of the entropy distribution operation f may make such solution computationally infeasible. A cryptographic hash function H is an example of an operation that may be used as an entropy redistribution operation. For example, consider a strong hash function H that produces a 256-bit result. Given a random 256-bit initial key $K_0$, let $K_i=H(K_{i-1})$ for each i>1. An adversary with knowledge of (for example) the least-significant bit of each $K_0 \ldots K_{999,999}$ has 1,000,000 bits of data related to $K_0$. A hypothetical adversary with infinite computing power could find by testing all possible $2^{256}$ values for $K_0$ to identify a value which is consistent with the known sequence of least-significant bits. Actual adversaries have finite computational power available, however, and the entropy redistribution operation prevents there from being a computationally practical way to solve for $K_0$ (or any other $K_i$) given the information leaked through attempted external monitoring attacks.

Entropy redistribution operations may be implemented, without limitation, using cryptographic hash functions, operations constructed using block ciphers (such as AES), pseudorandom transformations, pseudorandom permutations, other cryptographic operations, or combinations thereof. As a matter of convenience, certain exemplary embodiments are described with respect to a hash, but those skilled in the art will understand that, pursuant to the foregoing, other entropy redistribution functions may also be used instead or in addition.

Multiple entropy redistribution operations may also be constructed from a base operation. By way of example, if two 256-bit entropy redistribution operations $f_0(\ )$ and $f_i(\ )$ are required, $f_0(\ )$ could comprise applying the SHA-256 cryptographic hash function to the operation identifier string "f0" concatenated with the input to $f_0(\ )$ while $f_1(\ )$ could comprise applying SHA-256 to the operation identifier string "f1" concatenated with the input to $f_1(\ )$ Entropy redistribution operations can be construed using the well-known AES block cipher. For example, to implement $f_0(\ ) \ldots f_{b-1}(\ )$ each $f_i(\ )$ can use its input as an AES-256 key to encrypt a pair of 128-bit input blocks that are unique to the choice of i within $0 \ldots b-1$, yielding 256 bits of output.

The key tree 800 may be able to compute a set of non-linear cryptographic entropy redistribution operations $f_0(\ ), f_1(\ ) \ldots, f_{b-1}(\ )$, where b>1 is a positive integer. These b entropy redistribution functions can be configured in a tree structure. For example, a simple b-ary tree structure of height Q (i.e., having Q+1 levels, from 0 through Q) can be created by using b distinct entropy distribution functions, $f_0($ ) ... $f_{b-1}$( ), to represent the b possible branches of this b-ary tree at each node of the tree, each node representing a possible derived base key. In such a tree, starting from a root cryptographic key $K_{START}$ (which is at level 0), b possible derived base keys can be computed at level 1: $f_0(K_{START})$ for the leftmost branch; $f_1(K_{START})$ for the next branch; and continuing until $f_{b-1}(K_{START})$ for the rightmost branch. At level 2, $b^2$ possible keys can be derived, since each of $f_0$( ) ... $f_{b-1}$( ) could be applied to each of the b possible level 1 keys. Of course, computing a specific level 2 node only requires two, not $b^2$, computations (i.e., the nodes not on the path are not computed). The tree continues for successive levels 1 through Q, where each possible key (i.e., a different node) of a prior level can be processed by applying $f_0$( ) .. . $f_{b-1}$( ) in turn to derive b additional possible derived base keys. The entire key tree has Q+1 levels, starting with a single node at level 0, continuing with $b^i$ nodes at level i, and ending with $b^Q$ nodes at level Q. Thus, there are $b^Q$ possible paths from the root node at level 0 to the $b^Q$ final nodes at level Q. Each such possible path, corresponding to a unique the sequence of functions applied at the different levels, can be represented as a sequence of Q integers, each integer being selected from (0 . . . b−1). For example, in an exemplary embodiment, b=2. Thus, two entropy redistribution operations, $f_0$( ) and $f_1$( ) are used (and may be constructed from a base operation, e.g., as described above). If Q=128 (i.e., the height is 128), $2^{128}$ paths are possible and 128 entropy redistribution function computations are required to derive the level Q key from the level 0 node (i.e., the starting key).

As a variation, embodiments may involve more variety in the choice of b, such as varying the value of b among levels, and/or varying b based on the route taken to a particular level. Likewise, the entropy redistribution operations can also be varied, such as by making the entropy redistribution operations $f_i$( ) differ at different levels or making these operations depend on the sequence taken to a particular level.

An example key derivation process is diagrammed in FIG. 8. The process begins with a starting point of the tree, which is denoted $K_{START}$ (801), and a path $P_1 \ldots P_Q$ (802). For example, $K_{START}$ is the value of the device generated key and path $P_1 \ldots P_Q$ (802) is determined by the entity ID. (The conversion of entity ID into $P_1 \ldots P_Q$ is discussed below.) The path specifies a succession of entropy redistribution operations to be applied to $K_{START}$.

In an implementation, entity ID $H_1$ is decomposed into Q parts $P_1, P_2, \ldots P_Q$. In an example decomposition, each part $P_i$ is an integer from 0 thru (b−1) (e.g., if b=4 then each $P_i$ is a two-bit value (0, 1, 2, or 3)), Likewise, if b=2, each $P_i$ is a single bit 0 or 1). Hence, the path parts $P_1 \ldots P_Q$ can be used to specify a specific path from $K_{START}$ to $K_{START, PATH}$ by applying functions $f_0$( ), $f_1$( ) . . . , $f_{b-1}$( ) to produce a plurality of intermediate keys leading to $K_{START,PATH}$ as follows. First, the function $f_{P\ 1}$ is applied to $K_{START}$ (803) to yield an intermediate key $K_{START,P\ 1}$ followed by the application of $f_{P\ 2}$ on $K_{START,P1}$ to yield the intermediate key $K_{START,P\ 1,P\ 2}$ (804) and so on, until the final application of $f_{P\ Q}$ on the intermediate key $K_{START,P\ 1,P\ 2\ \ldots,P\ Q-1}$ (805) to yield the final derived base key, $K_{START,P\ 1,P\ 2,\ldots,P\ Q}$ (806). Note that the derivation of each intermediate key depends on at least one predecessor key and the relevant portion of the message identifier. For convenience, this final derived base key may be denoted with the notation $K_{START,PATH}$ (indicating the key that was reached by starting with $K_{START}$ and following PATH).

Figure 9:
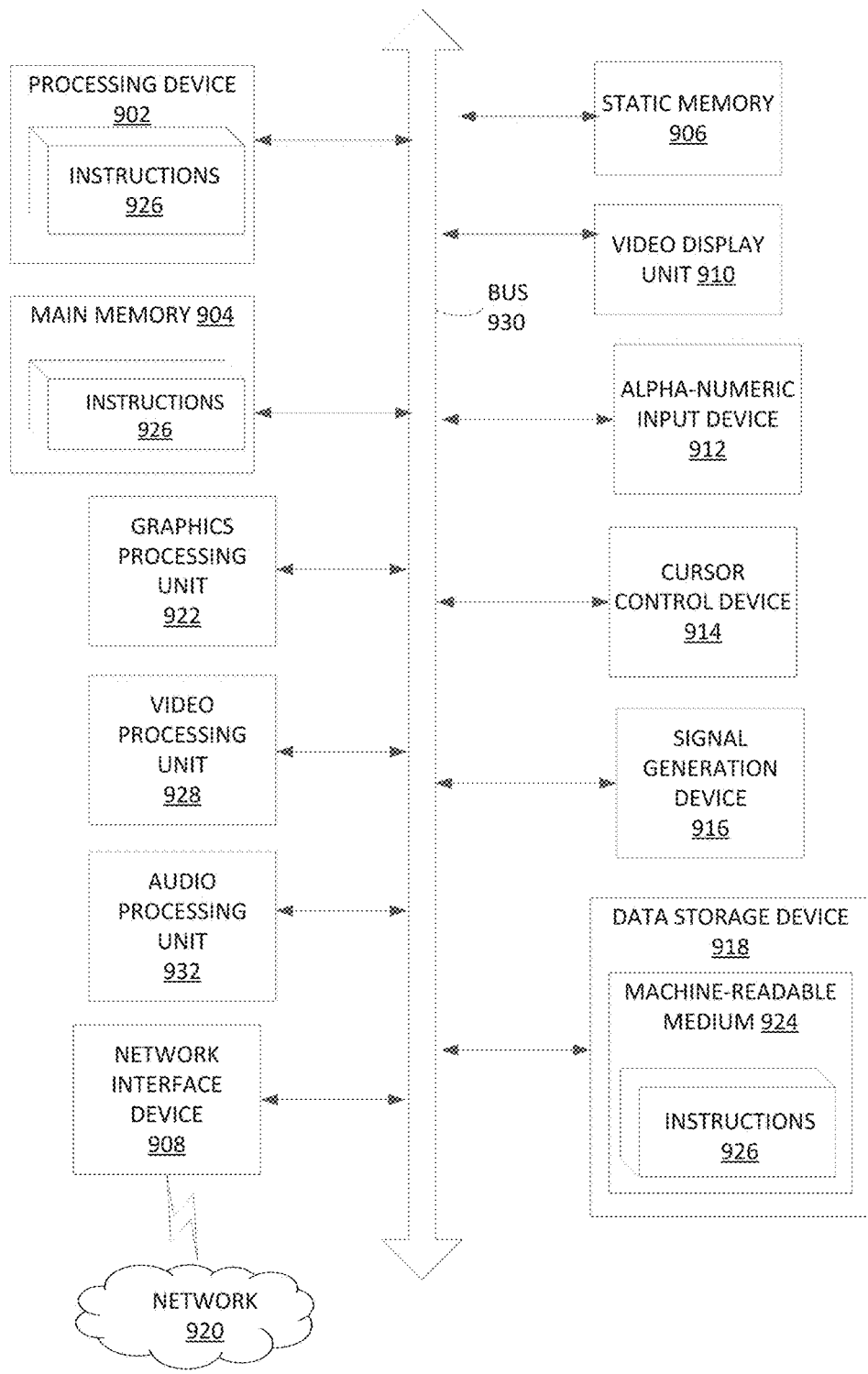
FIG. 9 illustrates a block diagram of an embodiment of a computer system in which some embodiments of the disclosure may operate.

FIG. 9 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet via a network 920. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system includes a processing device 902, a main memory 904 (e.g., read-only memory (ROM), flash memory, dynamic random access memory (DRAM) such as synchronous DRAM (SDRAM) or DRAM (RDRAM), etc.), a static memory 1106 (e.g., flash memory, static random access memory (SRAM), etc.), and a data storage device 1118, which communicate with each other via a bus 930.

Processing device 902 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 is configured to execute instructions 926 for performing the operations and steps discussed herein.

The computer system may further include a network interface device 908. The computer system also may include a video display unit 910 (e.g., a liquid crystal display (LCD) or a cathode ray tube (CRT)), an alphanumeric input device 912 (e.g., a keyboard), a cursor control device 914 (e.g., a mouse), a graphics processing unit 922, a video processing unit 928, an audio processing unit 932, and a signal generation device 916 (e.g., a speaker).

The data storage device 918 may include a machine-readable storage medium 924 (also known as a computer-readable medium) on which is stored one or more sets of instructions or software 926 embodying any one or more of the methodologies or functions described herein. The instructions 926 may also reside, completely or at least partially, within the main memory 904 and/or within the processing device 902 during execution thereof by the computer system, the main memory 904 and the processing device 902 also constituting machine-readable storage media.

In one implementation, the instructions 926 include instructions to implement functionality corresponding to a key deriver (e.g., key deriver 200 of FIG. 2 or key deriver 420 of FIG. 4). While the machine-readable storage medium 924 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
   receiving a request to generate a base key;
   receiving a device generated key being stored in a one-time programmable (OTP) memory;
   receiving an entity identification (ID) being stored in the OTP memory, the entity ID being updated in response to a request to update the entity ID by incrementing a value of a counter corresponding to the entity ID that is stored in the OTP memory; and
   generating the base key based on the updated entity ID and the device generated key being stored in the OTP memory.

2. The method of claim 1, further comprising:
   receiving a second request to generate a second base key;
   receiving a second value for the entity ID based on the second request; and
   generating the second base key based on the second value for the entity ID and the same device generated key being stored in the OTP memory.

3. The method of claim 1, wherein the device generated key is randomly generated by an integrated circuit associated with the OTP memory.

4. The method of claim 1, wherein the value of the counter corresponds to a plurality of bits of the OTP memory.

5. The method of claim 4, further comprising:
   receiving a request associated with a new entity; and
   incrementing the value of the counter being stored in the OTP memory in response to the request associated with the new entity, wherein the incrementing of the value of the counter is performed by programming one of the plurality of the bits of the OTP memory that corresponds to the value of the counter, wherein a second value for the entity ID is based on the incremented value of the counter being stored in the OTP memory.

6. The method of claim 1, further comprising:
   receiving an additional key; and
   generating an encrypted key based on a combination of the additional key and the base key.

7. The method of claim 1, further comprising:
   receiving an initialization request;

generating, in response to the initialization request, the device generated key based on a random selection of bits associated with physical characteristics of an integrated circuit that comprises the OTP memory; and storing the device generated key in the OTP memory.

8. A system comprising:
a one-time programmable (OTP) memory to store a device generated key and an entity identification (ID); and
a key deriver coupled with the OTP memory and to:
receive a request to generate a derived key;
receive the device generated key and the entity ID from the OTP memory in response to the request to generate the derived key, the entity ID being updated in response to a request to update the entity ID by incrementing a value of a counter corresponding to the entity ID that is stored in the OTP memory; and
generate the derived key based on the updated entity ID and the device generated key from the OTP memory.

9. The system of claim 8, wherein the key deriver is further to:
receive a second request to generate a second derived key;
receive a second value for the entity ID in response to the second request; and
generate the second derived key based on the second value for the entity ID and the same device generated key from the OTP memory that is used to generate the first derived base key.

10. The system of claim 8, wherein the device generated key is randomly generated by an integrated circuit associated with the OTP memory.

11. The system of claim 8, wherein the value of the counter corresponds to a plurality of bits of the OTP memory.

12. The system of claim 11, wherein the key deriver is further to:
receive a request associated with a new entity; and
increment the value of the counter being stored in the OTP memory in response to the request associated with the new entity, wherein the incrementing of the value of the counter is performed by programming one of the plurality of the bits of the OTP memory that corresponds to the value of the counter, wherein a second value for the entity ID is based on the incremented value of the counter being stored in the OTP memory.

13. The system of claim 8, wherein the key deriver is further to:
receive an additional key; and
generate an encrypted key based on a combination of the additional key and the first derived key.

14. The system of claim 8, wherein the key deriver is further to:
receive an initialization request;
generate, in response to the initialization request, the device generated key based on a random selection of bits associated with physical characteristics of an integrated circuit that comprises the OTP memory; and
store the device generated key in the OTP memory.

15. An apparatus comprising:
a one-time programmable (OTP) memory to store a device generated key and an entity identification (ID); and
a one-way function component coupled to the OTP memory and to:
receive a request to generate a derived base key;
receive the device generated key being stored in the OTP memory;
receive the entity ID being stored in the memory, the entity ID being updated in response to a request to update the entity ID by incrementing a value of a counter corresponding to the entity ID that is stored in the OTP memory; and
generate the derived base key based on the updated entity ID and the device generated key being stored in the OTP memory.

16. The apparatus of claim 15, wherein the one-way function component is further to:
receive a second request to generate a second derived base key;
receive a second value for the entity ID being stored in the OTP memory in response to the second request; and
generate the second derived base key based on the second value for the entity ID and the same device generated key being stored in the OTP memory.

17. The apparatus of claim 16, wherein the value of the counter corresponds to a plurality of bits of the OTP memory.

18. The apparatus of claim 17, the apparatus further comprising:
an OTP memory modifier component to:
receive a request associated with a new entity; and
increment the value of the counter being stored in the OTP memory in response to the request associated with the new entity, wherein the incrementing of the value of the counter is performed by programming one of the plurality of the bits of the OTP memory that corresponds to the value of the counter, wherein a second value for the entity ID is based on the incremented value of the counter being stored in the OTP memory.

19. The apparatus of claim 15, further comprising:
an encryption component to receive an additional key and to generate an encrypted key based on a combination of the additional key and the first derived base key.

20. The apparatus of claim 15, the apparatus further comprising:
an OTP memory modifier component to:
receive an a request to randomly generate the device generated key;
generate, in response to the request, the device generated key, wherein the device generated key comprises randomly sampled bit values based on physical characteristics of an integrated circuit; and
store the device generated key in the OTP memory.

* * * * *